(12) United States Patent
Smith

(10) Patent No.: US 9,968,071 B1
(45) Date of Patent: May 15, 2018

(54) PORTABLE GATE

(71) Applicant: Seth L. Smith, Nemaha, IA (US)

(72) Inventor: Seth L. Smith, Nemaha, IA (US)

( * ) Notice: Subject to any disclaimer, the term of this patent is extended or adjusted under 35 U.S.C. 154(b) by 627 days.

(21) Appl. No.: 14/688,299

(22) Filed: Apr. 16, 2015

(51) Int. Cl.
| | |
|---|---|
| *A01K 3/00* | (2006.01) |
| *E04H 17/00* | (2006.01) |
| *E06B 11/02* | (2006.01) |
| *E06B 11/04* | (2006.01) |

(52) U.S. Cl.
CPC .............. *A01K 3/00* (2013.01); *E04H 17/00* (2013.01); *E06B 11/022* (2013.01); *E06B 11/04* (2013.01)

(58) Field of Classification Search
CPC .......... A01K 3/00; A01K 3/002; E04H 17/00; E04H 17/14; E04H 17/1404; E04H 17/18; E04H 2017/1491; E06B 11/022; E06B 11/04
USPC ................................ 119/514, 513, 512, 502
See application file for complete search history.

(56) References Cited

U.S. PATENT DOCUMENTS

| | | | | |
|---|---|---|---|---|
| 256,661 A * | 4/1882 | Tarragon | .................. | A01K 3/00 119/512 |
| 479,680 A * | 7/1892 | Thompson | ............... | A01K 3/00 119/513 |
| 1,293,335 A * | 2/1919 | Chambliss | .............. | E04H 17/16 119/512 |
| 1,330,404 A * | 2/1920 | Sommer | .............. | A01K 1/0005 119/502 |
| 1,331,117 A * | 2/1920 | Miller | ....................... | A63H 3/52 119/502 |
| 2,517,386 A * | 8/1950 | Cooper | ................... | E04H 17/18 256/25 |
| 2,581,318 A * | 1/1952 | Bartlett | .................... | A01K 3/00 119/514 |
| 3,002,493 A * | 10/1961 | Galamba | ................. | E04H 17/18 119/514 |
| 3,135,267 A * | 6/1964 | Liebig | .................. | A01D 85/001 119/512 |
| 3,203,033 A * | 8/1965 | Banse | ...................... | A01K 1/02 119/513 |
| 3,204,606 A * | 9/1965 | Parr | ...................... | A01K 1/0005 119/514 |
| 3,215,118 A * | 11/1965 | Behlen | .................... | E04C 2/427 119/513 |
| 3,387,825 A * | 6/1968 | Kreeger | ................. | A01K 3/005 174/163 F |
| 3,533,189 A * | 10/1970 | Appell | .................... | E06B 11/04 16/364 |

(Continued)

*Primary Examiner* — Marc Burgess
*Assistant Examiner* — Michael A. Fabula
(74) *Attorney, Agent, or Firm* — Dennis L. Thomte; Thomte Patent Law Office LLC

(57) ABSTRACT

A portable gate including a center gate section, a center divide gate, a first end divide gate, a second end divide gate, a first end gate, and a second end gate. If the portable gate is located in a building, the portable gate will also include a wall mounted gate. If the portable gate is located in an area bounded by a fence, a fence mounted gate replaces the wall mounted gate. The gates may be hingedly moved to form four holding pens. When the gates are folded so as to be positioned adjacent the inner and outer sides of the center section, a front-end loader may move the portable gate to another location. The opposite ends of the center gate section are provided with double-knuckle hinge joints.

3 Claims, 10 Drawing Sheets

(56) References Cited

U.S. PATENT DOCUMENTS

| Patent/Publication No. | Date | Name | Classification |
|---|---|---|---|
| 3,545,407 A * | 12/1970 | Moore | A01K 3/00 119/502 |
| 3,648,980 A * | 3/1972 | Taylor | A01K 3/00 119/512 |
| 3,767,167 A * | 10/1973 | Rasmussen | E04H 17/18 256/24 |
| 4,148,277 A * | 4/1979 | Engle | A01K 1/0005 119/502 |
| 4,193,377 A * | 3/1980 | Weldy | A01K 1/0005 119/502 |
| 4,201,157 A * | 5/1980 | Lambert | A01K 1/0613 119/512 |
| 4,341,181 A * | 7/1982 | Fair | A01K 3/00 119/512 |
| 4,356,999 A * | 11/1982 | McShane | B60P 3/00 256/26 |
| 4,787,603 A * | 11/1988 | Norton | A01K 3/00 119/513 |
| 4,924,813 A * | 5/1990 | Bixler | A01K 3/00 119/512 |
| 4,960,074 A * | 10/1990 | Wilson | A01K 3/00 119/512 |
| 5,058,863 A * | 10/1991 | Maffet | E04B 2/7431 160/135 |
| 5,115,763 A * | 5/1992 | Wilson | A01K 3/00 119/512 |
| 5,237,960 A * | 8/1993 | Wilson | A01K 3/00 119/514 |
| 5,362,030 A * | 11/1994 | Iler, Jr. | E04H 17/1413 256/19 |
| 5,899,171 A * | 5/1999 | Abrahamson | A01K 3/00 119/512 |
| 6,067,940 A * | 5/2000 | Holder | A01K 3/00 119/512 |
| 6,167,842 B1 * | 1/2001 | Akins | A01K 1/0613 119/502 |
| 6,450,124 B1 * | 9/2002 | Calvert | A01K 3/00 119/512 |
| 6,467,433 B1 * | 10/2002 | Stanton | A01K 1/03 119/512 |
| 6,477,985 B1 * | 11/2002 | Mennenga | A01K 1/0236 119/474 |
| 6,554,257 B1 * | 4/2003 | Kenton | E04G 21/3233 256/24 |
| 7,350,480 B1 * | 4/2008 | Hughes | A01K 3/005 119/512 |
| 8,438,995 B1 * | 5/2013 | Donahue | A01K 1/034 119/452 |
| 2002/0148411 A1 * | 10/2002 | Markham | A01K 3/00 119/512 |
| 2003/0146426 A1 * | 8/2003 | Ray | A01K 3/00 256/59 |
| 2003/0209206 A1 * | 11/2003 | Campbell | A01K 3/00 119/513 |
| 2006/0070582 A1 * | 4/2006 | Prescott | A01K 3/00 119/512 |
| 2007/0170411 A1 * | 7/2007 | Ribak | E01F 13/022 256/32 |
| 2007/0210293 A1 * | 9/2007 | Cheng | E04H 17/18 256/26 |
| 2008/0296548 A1 * | 12/2008 | McDonald | A01K 1/0005 256/26 |
| 2009/0000564 A1 * | 1/2009 | Meyer, Jr. | A01K 1/0017 119/514 |
| 2011/0120384 A1 * | 5/2011 | Wilson | A01K 3/00 119/521 |
| 2012/0223283 A1 * | 9/2012 | Kobayashi | A01K 1/034 256/26 |
| 2013/0001493 A1 * | 1/2013 | Svedberg | E04G 21/3223 256/26 |
| 2014/0145046 A1 * | 5/2014 | Layne | E04H 12/2238 248/188.1 |
| 2015/0075442 A1 * | 3/2015 | Wilson | A01K 3/00 119/512 |
| 2015/0196006 A1 * | 7/2015 | Scudder | A01K 3/00 119/702 |
| 2015/0250136 A1 * | 9/2015 | Wilson | A01K 3/00 119/452 |
| 2015/0334987 A1 * | 11/2015 | Schwartz | A01K 3/00 119/514 |

* cited by examiner

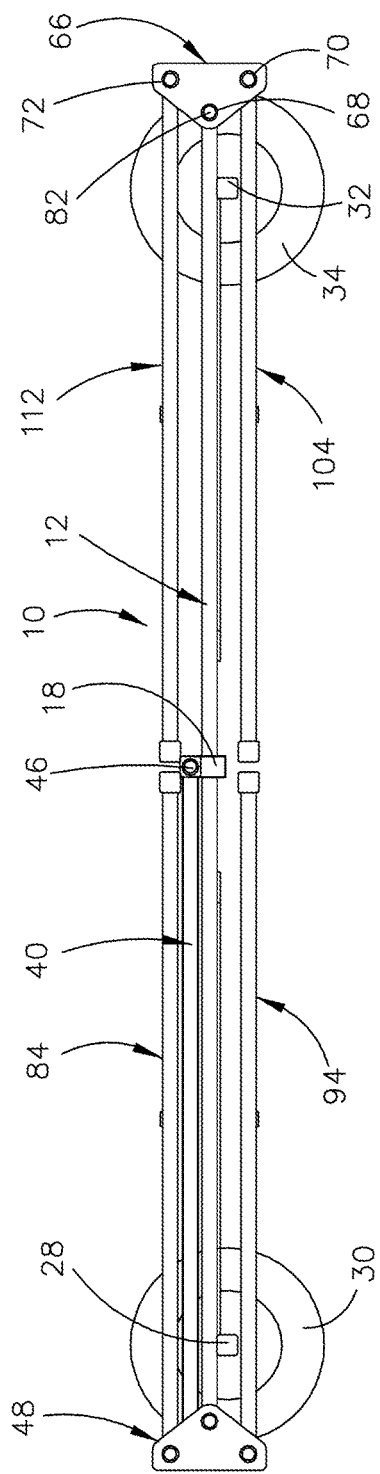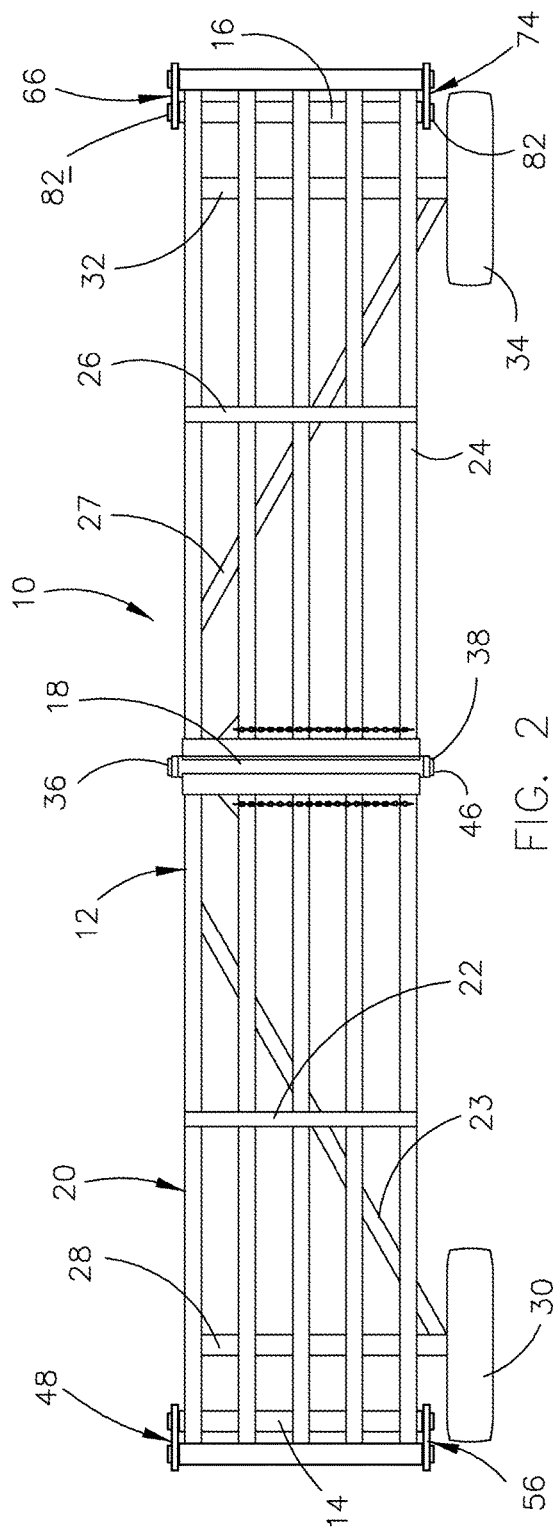

PORTABLE GATE

BACKGROUND OF THE INVENTION

Field of the Invention

This invention relates to a portable gate system for use in an animal confinement building or in a feed lot or the like.

Description of the Related Art

To the best of applicant's knowledge, no one has previously provided a portable gate system which includes gate sections which may be folded upon themselves for transport from one location to another and which may have divide gate sections extending therefrom to create 3 or 4 holding pens. Further, the prior art, to the best of applicant's knowledge has not provided a unique double-knuckle hinge structure on the ends of a center gate section which permits end divide gates and end gates to be pivotally secured together in a fashion which permits the end gates and divide gates to be properly positioned even if the center gate section is not properly positioned with respect to the walls of a building or fences.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A portable gate system is provided for use in an animal confinement building or a feedlot or the like. The portable gate system includes a vertically disposed center gate section having a first end, a second end, an inner side and an outer side. A vertically disposed first tubular member is secured to the first end of the center gate section and a vertically disposed second tubular member is secured to the second end of the center gate structure. A vertically disposed center divide gate, having inner and outer ends, has its inner end hingedly secured about a vertical axis to the center gate section at the center length thereof at the inner side thereof. The center divide gate is selectively movable between folded and extended positions with respect to the center gate section with the center divide gate extending transversely from the inner side of the center gate section when in its extended position whereby the outer end of the center divide gate is positioned closely adjacent to a wall of the building. The center divide gate is positioned adjacent the inner side of the center gate section at one end thereof when in its folded position.

An elongated and vertically disposed first pipe is positioned in the first tubular member with the first tubular member being rotatable with respect to the first pipe. A horizontally disposed first upper hinge plate has first, second, and third openings formed therein and is positioned above the upper end of the first tubular member. The upper end of the first pipe is received by the first opening in the first upper hinge plate and is secured to the first upper hinge plate thereto for movement therewith. A horizontally disposed first lower hinge plate having first, second and third openings formed therein is positioned below the lower end of the first tubular member with the lower end of the first pipe being received by the first opening in the first lower hinge plate and is secured to the first lower hinge plate for movement therewith.

The portable gate system also includes an elongated and vertically disposed second pipe which is positioned in the second tubular member. The second tubular member is rotatable with respect to the second pipe. A horizontally disposed second upper hinge plate is positioned above the upper end of the second tubular member at the upper end of the second pipe being received by the first opening in the second upper hinge plate and is secured to second upper hinge plate for movement therewith. A horizontally disposed second lower hinge plate is also provided having first, second and third opening formed therein with the second lower hinge plate being positioned below the lower end of the second tubular member. The lower end of the second pipe is received by the first opening in the second lower hinge plate and is secured to the second lower hinge plate for movement therewith.

The portable gate system also includes a vertically disposed first end divide gate which has a vertically disposed third tubular member at the inner end thereof. An elongated and vertically disposed third pipe is positioned in the third tubular member whereby the third tubular member is rotatable with respect to the third pipe. The upper end of the third pipe is received by the second opening in the first upper hinge plate and is secured to the first upper hinge plate for movement therewith. The lower end of the third pipe is received by the second opening in the first lower hinge plate and is secured thereto for movement therewith. The first end divide gate is selectively hingedly moveable with respect to the center gate section between extended and folded positions wherein the first end divide gate, when in the extended position, extends transversely outwardly with respect to the center gate section so that the outer end of the first end divide gate is positioned adjacent the first wall of the building. The first end divide gate, when in its folded position, is positioned adjacent to the inner side of the center gate section at the first end thereof.

The portable gate system also includes a vertically disposed second end divide gate having a vertically disposed fourth tubular member at the inner end thereof. An elongated and vertically disposed fourth pipe is positioned in the fourth tubular member whereby the fourth tubular member is rotatable with respect to the fourth pipe. The upper end of the fourth pipe is received by the second opening in the second upper hinge plate and is secured to the second upper hinge plate for movement therewith. The lower end of the fourth pipe is received by the second opening in the second lower hinge plate and is secured to the second lower hinge plate for movement therewith. The second end divide gate is selectively moveable with respect to the center gate section between extended and folded positions whereby the second end divide gate, when in the extended position, extends transversely outwardly with respect to the center gate section so that the outer end of the second end divide gate is positioned adjacent to the first wall of the building. The second end divide gate, when in the folded position, is positioned adjacent the inner side of the center gate section at the second end thereof.

An elongated and vertically disposed first end gate has a vertically disposed fifth tubular member secured to the inner end thereof. An elongated and vertically disposed fifth pipe is positioned in the fifth tubular member with the fifth tubular member being rotatable with respect to the fifth pipe. The upper end of the fifth pipe is received by the third opening in the first upper hinge plate and is secured to the first upper hinge plate for movement therewith. The lower end of the fifth pipe is received by the third opening in the first lower hinge plate and is secured to the first lower hinge plate for movement therewith. The first end gate is selectively hingedly moveable between extended and folded positions with the first end gate, when in the extended position, is parallel to and spaced from the first wall of the building. The first end gate, when in the folded position, is positioned adjacent the outer side of the center gate section at one end thereof.

An elongated and vertically disposed wall mounted gate has its inner end hingedly secured to the first wall with the wall mounted gate being selectively moveable to an extended position wherein the wall mounted gate extends transversely from the first wall of the budding for connection to the outer end of the first end gate when the first end gate is in the extended position.

The portable gate system also includes an elongated and vertically disposed second end gate having a sixth tubular member secured to the inner end thereof. An elongated and vertically disposed sixth pipe is positioned in the sixth tubular member whereby the sixth tubular member is rotatable with respect to the sixth pipe. The upper end of the sixth pipe is received by the third opening in the second upper hinge plate and is secured to the second upper hinge plate for movement therewith. The lower end of the sixth pipe is received by the third opening in the second lower hinge plate and is secured to the second lower hinge plate for movement therewith. The second end gate is selectively moveable between extended and folded positions whereby the second end gate, when in the extended position, has its outer end positioned closely adjacent the second wall. The second end gate, when in the folded position, is positioned adjacent the outer side of the center gate section at the second end thereof. A first ground engaging support is secured to the center gate section at the first end thereof and a second ground engaging support is secured to the second gate section at the second end thereof.

When the portable gate system is in its folded position, the portable gate may be transported from one location to another by the use of a skid-steer vehicle or a front-end loader.

The hinge plates of the invention create a double-knuckle hinge system so that the various gate sections may be positioned with respect to the walls of the building even though the center gate section is not positioned in the exact desired position.

The portable gate system may also be used in a feedlot or the like wherein fences are substituted for the building walls.

It is therefore a principal object of the invention to provide an improved portable gate system.

A further object of the invention is to provide a portable gate system including a center gate section having double-knuckle hinge assemblies at the opposite ends thereof.

A further object of the invention is to provide a portable gate system of the type described wherein end divide gates and end gates are attached to double-knuckle hinge systems at the opposite ends of the center gate section thereof.

A further object of the invention is to provide a portable gate system which may be folded upon itself for transport from one location to another by means of a skid-steer loader or a front-end loader.

A further object of the invention is to provide a portable gate system, when in the operative position, is extremely stable.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1 is a top view of the portable gate of this invention in its folded transport position;

FIG. 2 is a side view of the portable gate of this invention in its folded transport position;

DESCRIPTION OF THE PREFERRED EMBODIMENT

Figure 3:
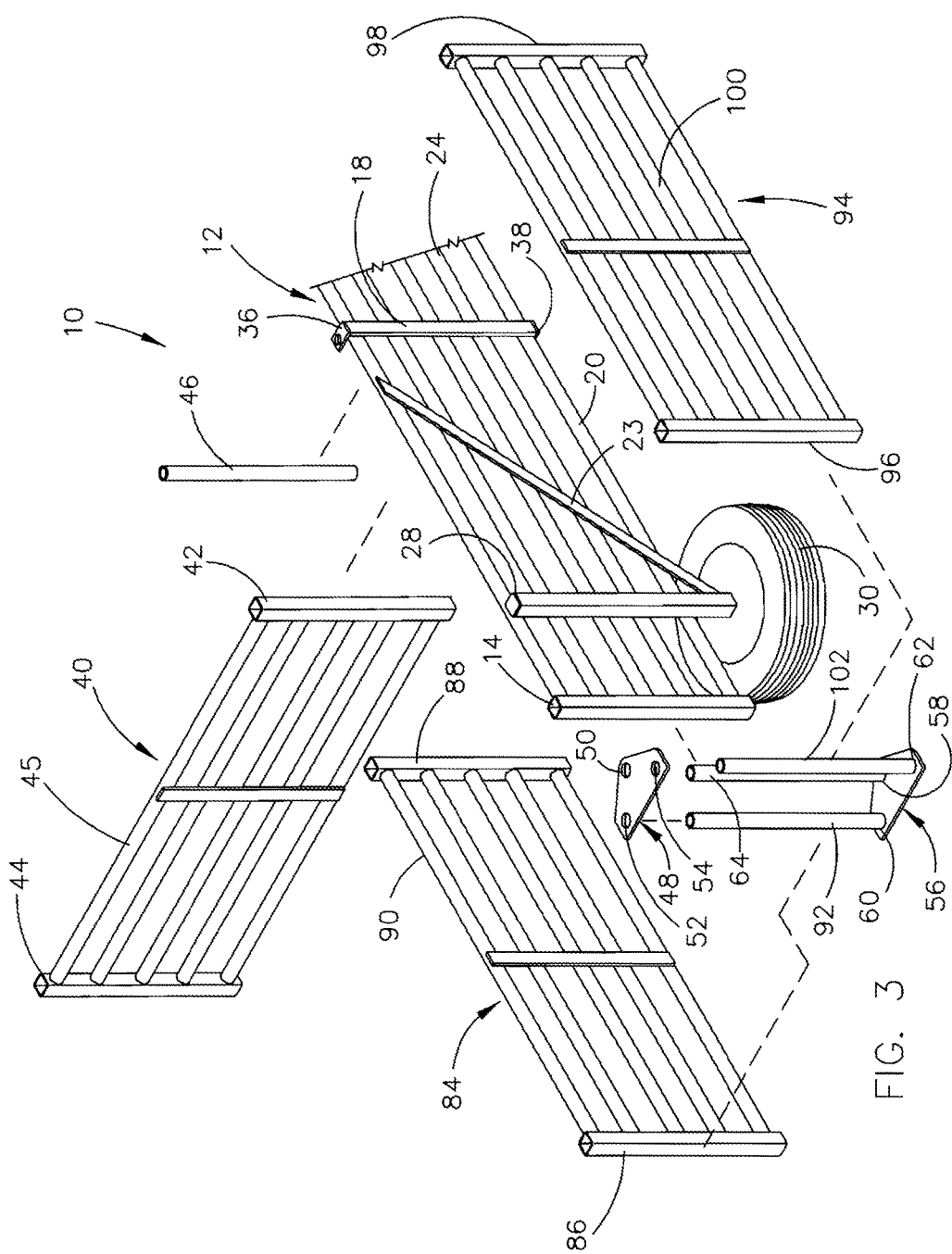
FIG. 3 is a partial exploded perspective view of the portable gate of this invention.
Figure 4:
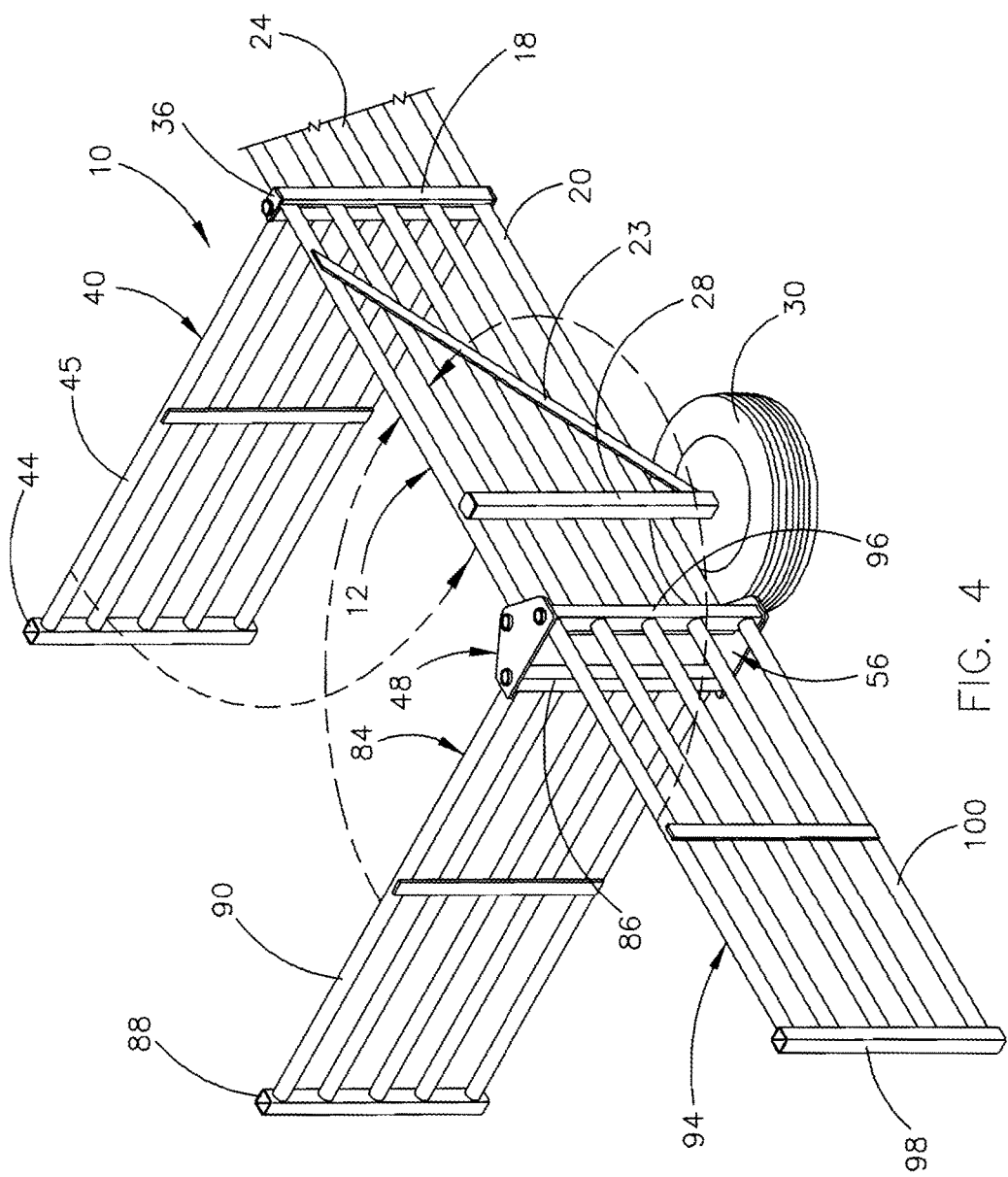
FIG. 4 is a partial perspective view of the portable gate of this invention.
Figure 5:
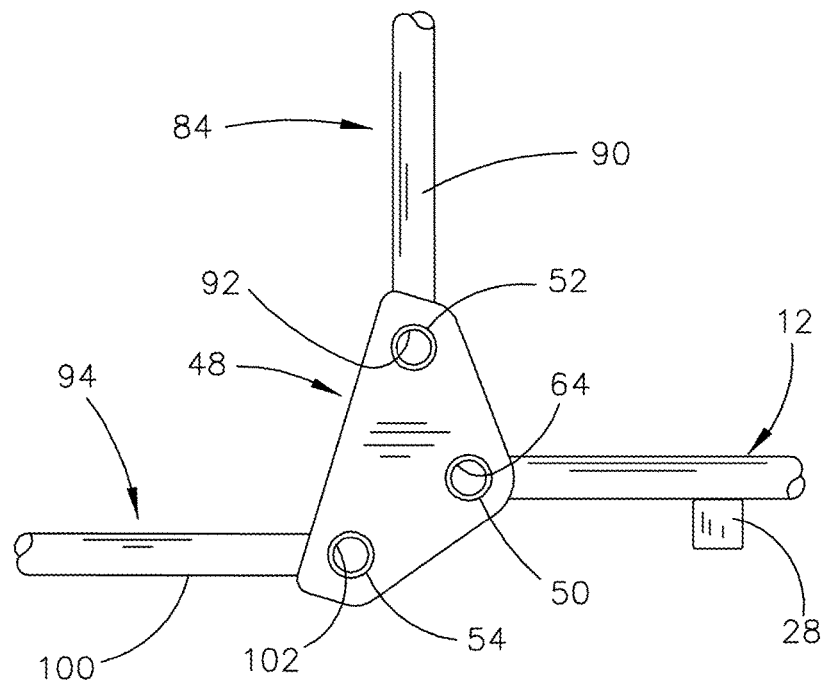
FIG. 5 is a top view of the first upper double-knuckle hinge of the portable gate of this invention.
Figure 6:
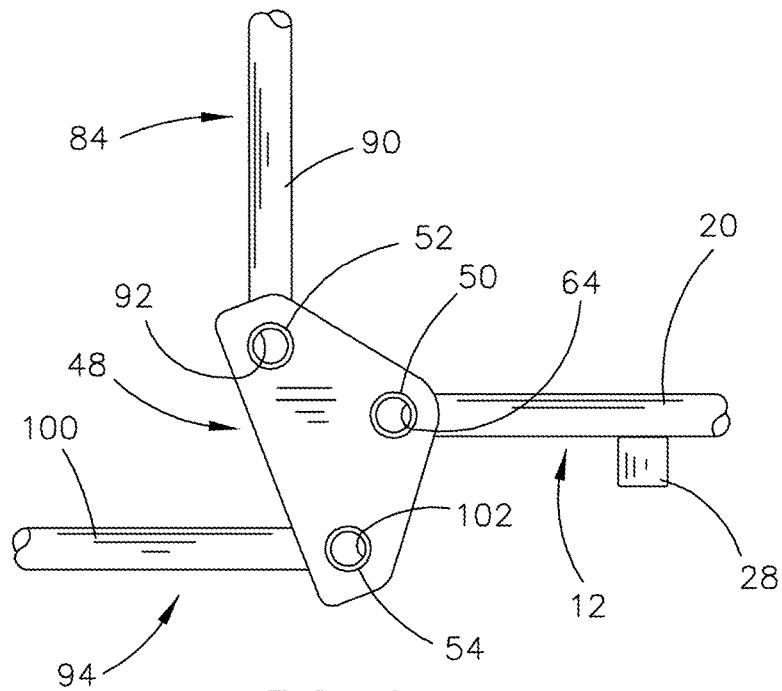
FIG. 6 is a top view of the first upper double-knuckle hinge wherein the first upper hinge has been pivoted from the position of FIG. 3.
Figure 7:
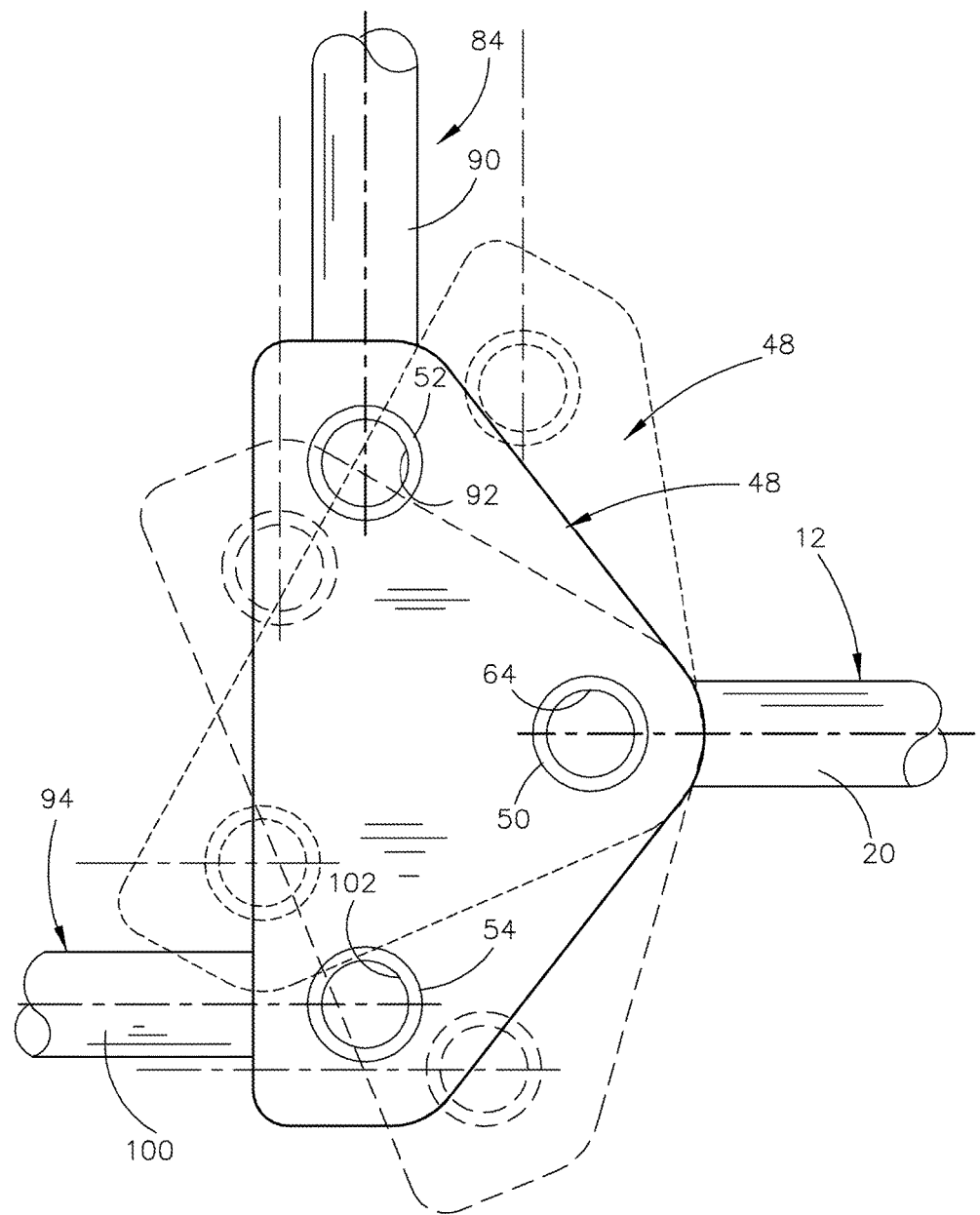
FIG. 7 is a top elevational view of the first upper hinge of the portable gate of this invention with the broken lines illustrating various pivotal positions of the hinge.
Figure 8:
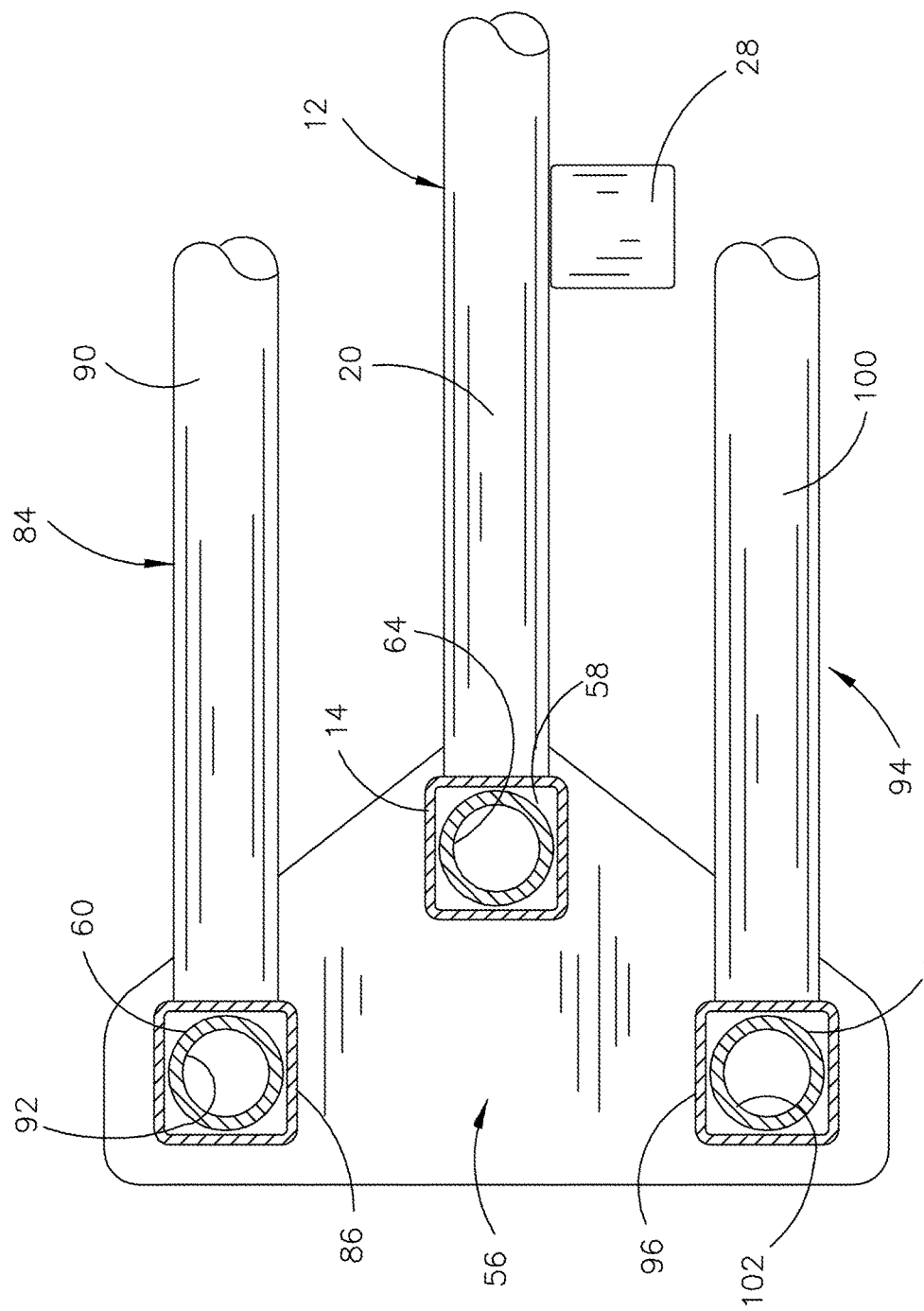
FIG. 8 is a partial sectional view as seen from above the first lower double-knuckle hinge of the portable gate of this invention.
Figure 9:
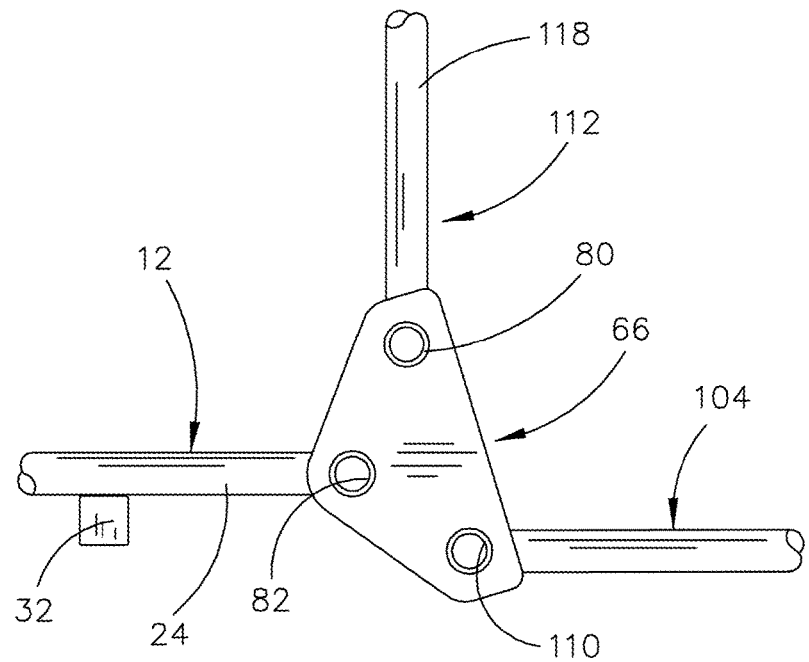
FIG. 9 is a top view of the second upper double-knuckle hinge of the portable gate of this invention.
Figure 10:
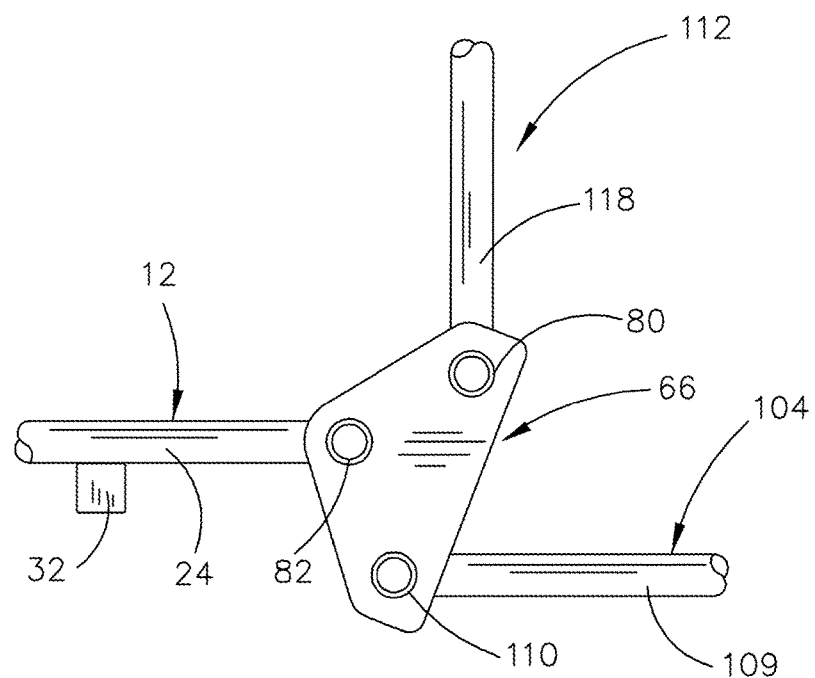
FIG. 10 is a top view of the second upper double-knuckle hinge wherein the second upper hinge has been pivoted from the position of FIG. 9.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The double-knuckle portable gate of this invention is referred to by the reference numeral 10. Gate 10 includes an elongated and vertically disposed center gate section 12 having vertically disposed tubular end posts 14 and 16 and a vertically disposed center post 18. A plurality of horizontally disposed and vertically spaced-apart rails 20 are secured to end post 14 and center post 18 by welding and extend therebetween. A vertically disposed brace 22 is secured to rails 20 by welding intermediate the lengths thereof. A diagonal brace 23 is secured to rails 20. A plurality of horizontally disposed and vertically spaced-apart rails 24 are secured to end post 16 and center post 18 by welding and extend therebetween. A vertically disposed brace 26 is secured to rails 24 by welding intermediate the lengths thereof. A diagonal brace 27 is secured to rails 24 by welding.

A vertically disposed support post 28 is secured to rails 20 by welding inwardly of end post 14. A concrete filled tire 30 is secured to the lower end of support post 28 to suspend the lowermost rail 20 above the ground. The lower end of brace 23 is secured to support post 28 near the lower end thereof. A vertically disposed support post 32 is secured to rails 24 by welding inwardly of post 16. A concrete filled tire 34 is secured to the lower end of support post 32 to suspend the lowermost rail 24 above the ground as seen in FIG. 2.

The center post 18 has a laterally extending plate 36 welded to the upper end thereof and has a laterally extending plate 38 welded to the lower end thereof.

The numeral 40 refers to a center divide gate member having vertically disposed hollow post 42 at its inner end and a vertically disposed hollow post 44 at its outer end. Rails 45 extend between posts 42 and 44. An elongated and vertically disposed pipe 46 is positioned between the outer ends of plates 36 and 38. The upper end of pipe 46 is welded to plate 36 and the lower end of pipe 42 is welded to plate 38. Post 42 pivotally embraces pipe 46 between plates 36 and 38 so that gate member 40 is hingedly or pivotally secured to post 18 about a vertical axis.

The numeral 48 refers to a generally triangular flat upper hinge plate having circular holes 50, 52 and 54 formed therein. The numeral 56 refers to a generally triangular lower hinge plate having circular openings 58, 60 and 62 formed therein. An elongated and vertically disposed round pipe 64 has its upper end positioned in hole 50 of hinge plate 48 and has its lower end positioned in hole 58 of hinge plate 56. The upper end of pipe 64 is welded to plate 48 and the lower end of pipe 64 is welded to plate 56. End post 14 rotatably or pivotally embraces pipe 64 between hinge plates 48 and 56

The hinge plates 48 and 56 are thus hingedly secured to end post 14 about a vertical axis and hingedly move together.

The numeral 66 refers to a generally triangular upper hinge plate which is identical to hinge plate 48 and which has circular holes 68, 70 and 72 formed therein. The numeral 74 refers to a generally triangular lower hinge plate which is identical to hinge plate 56 and which has circular holes 76, 78 and 80 formed therein. An elongated and vertically disposed round pipe 82 has its upper end positioned in hole 68 of upper plate 66 and has its lower end positioned in hole 76 of lower plate 74. The upper end of pipe 82 is welded to upper plate 66 and the lower end of pipe 82 is welded to lower plate 74. End post 16 rotatably embraces pipe 82 between hinge plates 66 and 74. The hinge plates 66 and 74 are hingedly secured to end post 16 about a vertical axis and hingedly move together.

The numeral 84 refers to a first end divide gate having an inner hollow and vertically disposed tubular member 86, an outer hollow and vertically disposed tubular member 88 and rails 90 secured to and extending between tubular members 86 and 88. An elongated and vertically disposed pipe 92 has its upper end received in opening 52 of hinge plate 48 and its lower end received in opening 60 in hinge plate 56. The upper end of pipe 92 is welded to hinge plate 48 and the lower end of pipe 92 is welded to hinge plate 56. The tubular member 86 has the pipe 92 extending therethrough so that gate 84 is hingedly or pivotally secured to the hinge plates 48 and 56.

The numeral 84 refers to an end gate section having a hollow and vertically disposed tubular member 96 at its inner end and a vertically disposed tubular member 98 at its outer end. Rails 100 are secured to tubular members 96 and 98 and extend therebetween. An elongated and vertically disposed pipe 102 has its upper end received by opening 54 in hinge plate 48 and has its lower end received by opening 62 in hinge plate 56. Pipe 102 has its upper end welded to hinge plate 48 and has its lower end welded to hinge plate 56.

The tubular member 96 has the pipe 102 extending therethrough so that gate section 94 is hingedly or pivotally secured to the hinge plates 48 and 56.

The numeral 104 refers to a second end gate including a hollow and vertically disposed gate having a vertically disposed inner tubular member 106 and a vertically disposed outer tubular member 108. Gate 104 is identical to gate 84 and will not be described in further detail except for the following. A vertically disposed pipe 110 has its upper end received in opening 70 of hinge plate 66 and has its lower end received in opening 78 in hinge plate 74. The upper end of pipe 110 is welded to hinge plate 66 and the lower end of pipe 110 is welded to hinge plate 74. Tubular member 106 rotatably embraces pipe 110 between hinge plates 66 and 74 to enable gate 104 to be pivotally or hingedly secured to pipe 110 about a vertically disposed axis.

The numeral 112 refers to a second end divide gate having a vertically disposed inner tubular member 114, a vertically disposed outer tubular member 116 with rails 118 extending therebetween. An elongated and vertically disposed pipe 119 has its upper end received by opening 72 of upper hinge plate 66 and has its lower end received by opening 80 in lower hinge plate 74. The upper end of pipe 119 is secured to upper hinge plate 66 by welding and the lower end of pipe 119 is secured to lower hinge plate 74 by welding. The second end divide gate 112 is movable from an extended position wherein the outer end of the second divide gate is closely adjacent to the first wall 120. When the second end divide gate 112 is in its folded position, it is closely adjacent the outer side of center gate section 12 and the second end thereof.

Figure 11:
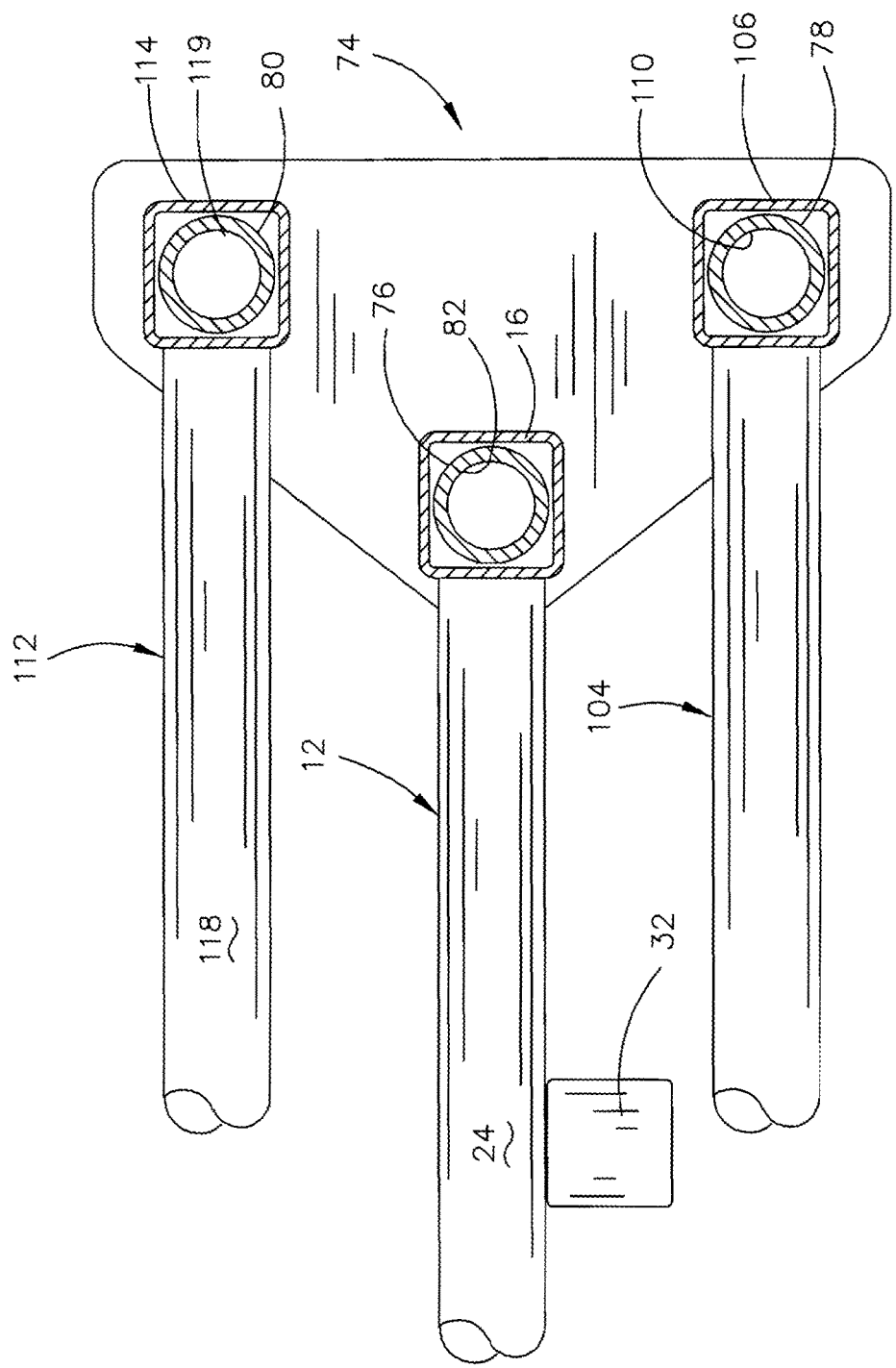
FIG. 11 is a partial sectional view as seen from above the second lower double-knuckle hinge of the portable gate of this invention.
Figure 12:
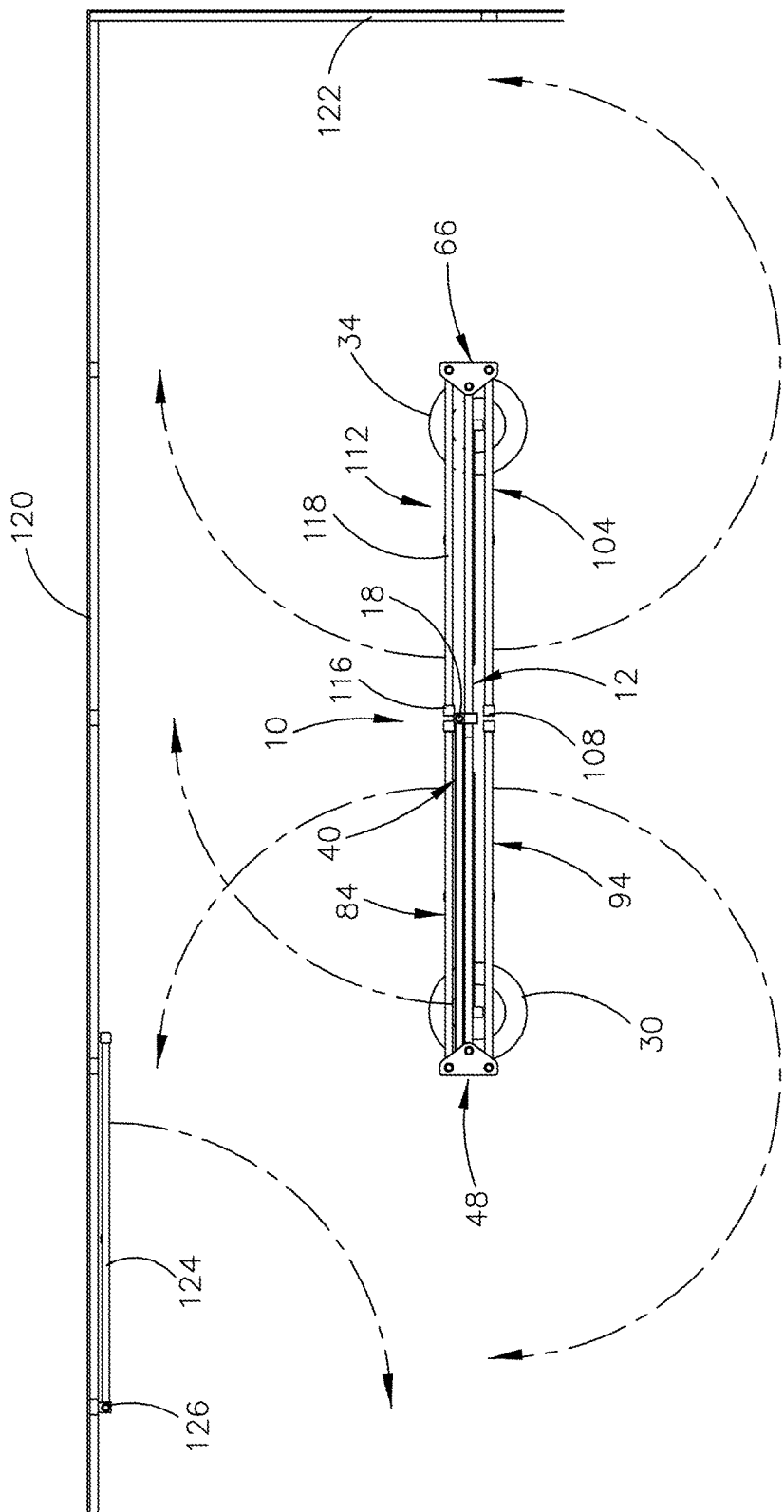
FIG. 12 is a top view of the portable gate of this invention in its folded transport position.
Figure 13:
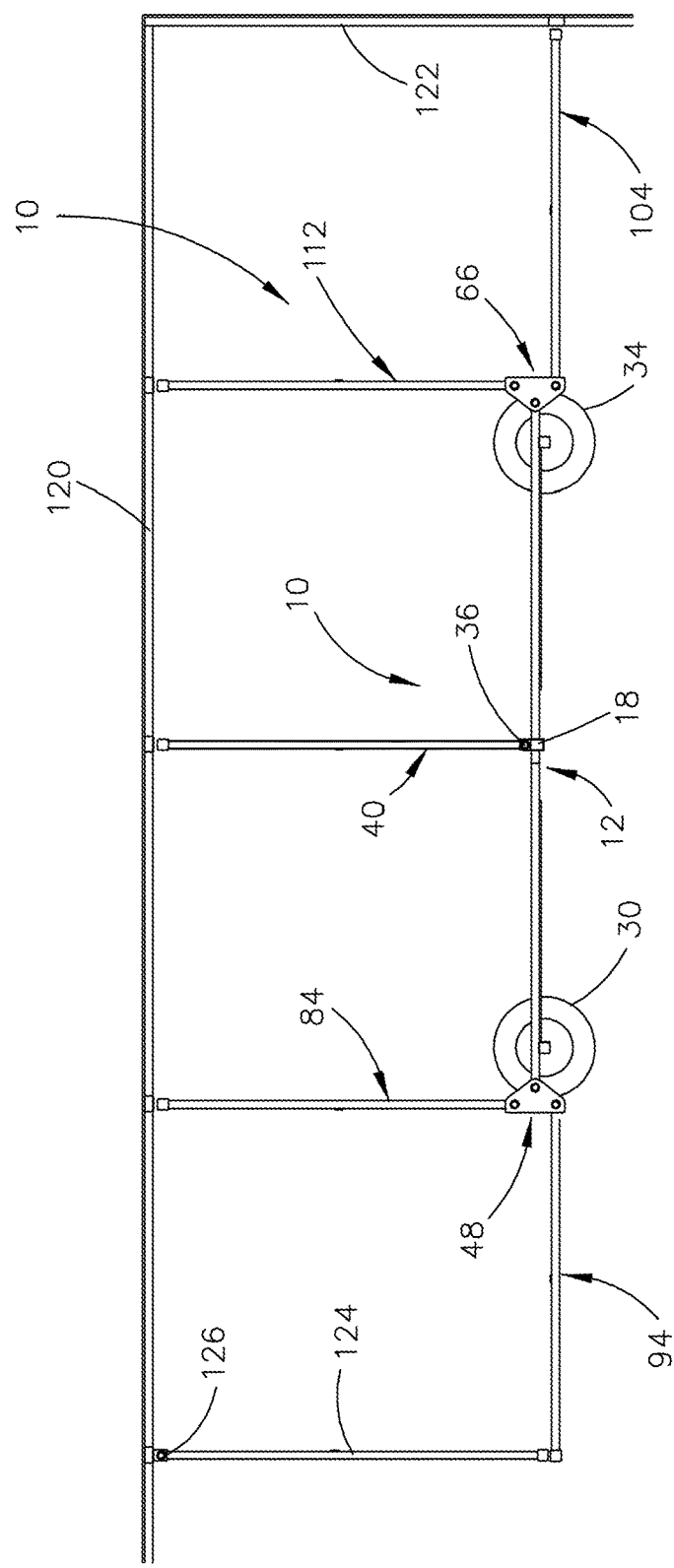
FIG. 13 is a top view of the portable gate of this invention in its extended or unfolded position in a building thereby creating four holding pens.

The portable gate 10 is ideally suited for use in a building having a first wall 120 at a second wall 122 which extends transversely from one end of first wall 120. The portable gate 10 may also be used wherein fences are substituted for the walls 120 and 122. In either situation, it is preferred that an optional gate member 124 has its inner end 126 pivotally or hingedly secured to the wall 120 or fence about a vertical axis. Gate member 124 may be pivoted with respect to wall 120 from a stowed position adjacent wall 120 or pivoted to the extended position of FIG. 11 so that the outer end of gate member 124 is adjacent to the outer end of gate 94. The outer ends of gates 94 and 124 will then be connected with a chain or the like.

FIG. 1 illustrates the portable gate in its stowed position for transport to the desired location by a skid steer vehicle, a front end loader, etc. In the position of FIG. 1, the first end gate 94 is positioned adjacent the outer side of center gate section 12 at one end thereof and the second end gate 104 is positioned adjacent the outer side of center gate section 12 at the other end thereof. The center divide gate 40 is positioned adjacent the other side of center divide section 12 at one end thereof. The first end gate 94 is positioned adjacent the outer side of center divide 40. The second end gate 112 is positioned adjacent center divide gate 12. The gates will be normally chained together during transport.

The hinge plates of the invention create a double-knuckle hinge system so that the various gate sections may be positioned with respect to the walls of the building even though the center gate section is not positioned in the exact desired position.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A portable gate system for use in a building having a first wall with first and second ends and a second wall which extends transversely from the first end of the first wall, comprising:
    an elongated and vertically disposed center gate section having a first end, a second end, a lower end, an upper end, an inner side and an outer side;
    a vertically disposed first tubular member, having upper and lower ends, secured to said first end of said center gate section;
    a vertically disposed second tubular member, having upper and lower ends, secured to said second end of said center gate section;
    a vertically disposed center divide gate having inner and outer ends;
    said inner end of said center divide gate being hingedly secured about a vertical axis to said center gate section at the center length thereof at said inner side thereof;
    said center divide gate being selectively movable between folded and extended positions with respect to said center gate section;
    said center divide gate extending transversely from said inner side of said center gate section when in said extended position whereby said outer end of said center divide gate is positioned closely adjacent to the first wall of the building;
    said center divide gate being positioned adjacent said inner side of said center gate section at one end thereof when in said folded position;
    an elongated and vertically disposed first pipe, having upper and lower ends, positioned in said first tubular member;
    said first tubular member being rotatable with respect to said first pipe;
    said upper end of said first pipe being positioned above said upper end of said first tubular member;
    said lower end of said first pipe being positioned below said lower end of said first tubular member;
    a horizontally disposed first upper hinge plate having first, second and third openings formed therein;
    said first upper hinge plate being positioned above said upper end of said first tubular member;
    said upper end of said first pipe being received by said first opening in said first upper hinge plate and being secured to said first upper hinge plate for movement therewith;
    a horizontally disposed first lower hinge plate having first, second and third openings formed therein;
    said first lower hinge plate being positioned below said lower end of said first tubular member;
    said lower end of said first pipe being received by said first opening in said first lower hinge plate and being secured to said first lower hinge plate for movement therewith;
    an elongated and vertically disposed second pipe, having upper and lower ends, positioned in said second tubular member;
    said second tubular member being rotatable with respect to said second pipe;
    said upper end of said second pipe being positioned above said upper end of said second tubular member;
    said lower end of said second pipe being positioned below said lower end of said second tubular member;
    a horizontally disposed second upper hinge plate having first, second and third openings formed therein;
    said second upper hinge plate being positioned above said upper end of said second tubular member;
    said upper end of said second pipe being received by said first opening in said second upper hinge plate and being secured to said second upper hinge plate for movement therewith;
    a horizontally disposed second lower hinge plate having first, second and third openings formed therein;
    said second lower hinge plate being positioned below said lower end of said second tubular member;
    said lower end of said second pipe being received by said first opening in said second lower hinge plate and being secured to said second lower hinge plate for movement therewith;
    a vertically disposed first end divide gate having an inner end, an outer end, an upper end, and a lower end;
    said first end divide gate having a vertically disposed third tubular member, with upper and lower ends, at said inner end thereof;
    an elongated and vertically disposed third pipe, having upper and lower ends, positioned in said third tubular member;
    said third tubular member being rotatable with respect to said third pipe;
    said upper end of said third pipe being received by said second opening in said first upper hinge plate and being secured to said first upper hinge plate for movement therewith;
    said lower end of said third pipe being received by said second opening in said first lower hinge plate and being secured to said first lower hinge plate for movement therewith;
    said first end divide gate being selectively hingedly movable with respect to said center gate section between extended and folded positions;
    said first end divide gate, when in said extended position, extending transversely outwardly with respect to said center gate section whereby said outer end of said first end divide gate is positioned adjacent the first wall of the building;
    said first end divide gate, when in said folded position, being positioned adjacent said inner side of said center gate section at said first end thereof;
    a vertically disposed second end divide gate having an inner end, an outer end, an upper end and a lower end;
    said second end divide gate having a vertically disposed fourth tubular member, with upper and lower ends, at said inner end thereof;
    an elongated and vertically disposed fourth pipe, having upper and lower ends, positioned in said fourth tubular member;

said fourth tubular member being rotatable with respect to said fourth pipe;
said upper end of said fourth pipe being received by said second opening in said second upper hinge plate and being secured to said second upper hinge plate for movement therewith;
said lower end of said fourth pipe being received by said second opening in said second lower hinge plate and being secured to said second lower hinge plate for movement therewith;
said second end divide gate being selectively movable with respect to said center gate section between extended and folded positions;
said second end divide gate when in said extended position, extending transversely outwardly with respect to said center gate section whereby said outer end of said second end divide gate is positioned adjacent the first wall of the building;
said second end divide gate when in said folded position being positioned adjacent said inner side of said center gate section at said second end thereof;
an elongated and vertically disposed first end gate having inner and outer ends;
said first end gate having a vertically disposed fifth tubular member, with upper and lower ends, at said inner end thereof;
an elongated and vertically disposed fifth pipe, having upper and lower ends, positioned in said fifth tubular member;
said fifth tubular member being rotatable with respect to said fifth pipe;
said upper end of said fifth pipe being received by said third opening in said first upper hinge plate and being secured to said first hinge plate for movement therewith;
said lower end of said fifth pipe being received by said third opening in said first lower hinge plate and being secured to said first lower hinge plate for movement therewith;
said first end gate being selectively hingedly movable between extended and folded positions with respect to said first upper hinge plate and said lower hinge plate;
said first end gate, when in said extended position being parallel to and spaced from the first wall of the building;
said first end gate, when in said folded position, being positioned adjacent said outer side of said center gate section at one end thereof;
an elongated and vertically disposed wall mounted gate having inner and outer ends;
said inner end of said wall mounted gate configured to be hingedly secured to the first wall;
said wall mounted gate being selectively movable to an extended position wherein said wall mounted gate extends transversely from the first wall of the building for connection to said outer end of said first end gate when said first end gate is in said extended position;
an elongated and vertically disposed second end gate having first and second ends;
said second end gate having a vertically disposed sixth tubular member, with upper and lower ends, at said inner end thereof;
an elongated and vertically disposed sixth pipe having upper and lower ends, positioned in said sixth tubular member;
said sixth tubular member being rotatable with respect to said sixth pipe;
said upper end of said sixth pipe being received by said third opening in said second upper hinge plate and being secured to said second upper hinge plate for movement therewith;
said lower end of said sixth pipe being received by said third opening in said second lower hinge plate and being secured to said second lower hinge plate for movement therewith;
said second end gate being selectively movable between extended and folded positions;
said second end gate, when in said extended position, having said outer end thereof adjacent to the second wall;
said second end gate, when in said folded position, being positioned adjacent said outer side of said center gate section at said second end thereof;
a first ground engaging support secured to said center gate section at said first end thereof; and
a second ground engaging support secured to said center gate section at said second end thereof.

2. A portable gate system for use in a building having a first wall with first and second ends and a second wall which extends transversely from the first end of the first wall, comprising:
an elongated and vertically disposed center gate section having a first end, a second end, a lower end, an upper end, an inner side and an outer side;
a vertically disposed first tubular member, having upper and lower ends, secured to said first end of said center gate section;
a vertically disposed second tubular member, having upper and lower ends, secured to said second end of said center gate section;
a vertically disposed center divide gate having inner and outer ends;
said inner end of said center divide gate being hingedly secured about a vertical axis to said center gate section at the center length thereof at said inner side thereof;
said center divide gate being selectively movable between folded and extended positions with respect to said center gate section;
said center divide gate extending transversely from said inner side of said center gate section when in said extended position whereby said outer end of said center divide gate is positioned closely adjacent to the first wall of the building;
said center divide gate being positioned adjacent said inner side of said center gate section at one end thereof when in said folded position;
an elongated and vertically disposed first pipe, having upper and lower ends, positioned in said first tubular member;
said first tubular member being rotatable with respect to said first pipe;
said upper end of said first pipe being positioned above said upper end of said first tubular member;
said lower end of said first pipe being positioned below said lower end of said first tubular member;
a horizontally disposed first upper hinge plate having first, second and third openings formed therein;
said first upper hinge plate being positioned above said upper end of said first tubular member;
said upper end of said first pipe being received by said first opening in said first upper hinge plate and being secured to said first upper hinge plate for movement therewith;

a horizontally disposed first lower hinge plate having first, second and third openings formed therein;
said first lower hinge plate being positioned below said lower end of said first tubular member;
said lower end of said first pipe being received by said first opening in said first lower hinge plate and being secured to said first lower hinge plate for movement therewith;
an elongated and vertically disposed second pipe, having upper and lower ends, positioned in said second tubular member;
said second tubular member being rotatable with respect to said second pipe;
said upper end of said second pipe being positioned above said upper end of said second tubular member;
said lower end of said second pipe being positioned below said lower end of said second tubular member;
a horizontally disposed second upper hinge plate having first, second and third openings formed therein;
said second upper hinge plate being positioned above said upper end of said second tubular member;
said upper end of said second pipe being received by said first opening in said second upper hinge plate and being secured to said second upper hinge plate for movement therewith;
a horizontally disposed second lower hinge plate having first, second and third openings formed therein;
said second lower hinge plate being positioned below said lower end of said second tubular member;
said lower end of said second pipe being received by said first opening in said second lower hinge plate and being secured to said second lower hinge plate for movement therewith;
a vertically disposed first end divide gate having an inner end, an outer end, an upper end, and a lower end;
said first end divide gate having a vertically disposed third tubular member, with upper and lower ends, at said inner end thereof;
an elongated and vertically disposed third pipe, having upper and lower ends, positioned in said third tubular member;
said third tubular member being rotatable with respect to said third pipe;
said upper end of said third pipe being received by said second opening in said first upper hinge plate and being secured to said first upper hinge plate for movement therewith;
said lower end of said third pipe being received by said second opening in said first lower hinge plate and being secured to said first lower hinge plate for movement therewith;
said first end divide gate being selectively hingedly movable with respect to said center gate section between extended and folded positions;
said first end divide gate, when in said extended position, extending transversely outwardly with respect to said center gate section whereby said outer end of said first end divide gate is positioned adjacent the first wall of the building;
said first end divide gate, when in said folded position, being positioned adjacent said inner side of said center gate section at said first end thereof;
a vertically disposed second end divide gate having an inner end, an outer end, an upper end and a lower end;
said second end divide gate having a vertically disposed fourth tubular member, with upper and lower ends, at said inner end thereof;
an elongated and vertically disposed fourth pipe, having upper and lower ends, positioned in said fourth tubular member;
said fourth tubular member being rotatable with respect to said fourth pipe;
said upper end of said fourth pipe being received by said second opening in said second upper hinge plate and being secured to said second upper hinge plate for movement therewith;
said lower end of said fourth pipe being received by said second opening in said second lower hinge plate and being secured to said second lower hinge plate for movement therewith;
said second end divide gate being selectively movable with respect to said center gate section between extended and folded positions;
said second end divide gate, when in said extended position, extending transversely outwardly with respect to said center gate section whereby said outer end of said second end divide gate is positioned adjacent the first wall of the building;
said second end divide gate when in said folded position being positioned adjacent said inner side of said center gate section at said second end thereof;
a vertically disposed end gate having an inner end, an outer end, an upper end, and a lower end;
said end gate having a vertically disposed fifth tubular member, with upper and lower ends, at said inner end thereof;
an elongated and vertically disposed fifth pipe, having upper and lower ends, positioned in said fifth tubular member;
said fifth tubular member being rotatable with respect to said fifth pipe;
said upper end of said fifth pipe being received by said third opening in said second upper hinge plate and being secured to said second upper hinge plate for movement therewith;
said lower end of said fifth pipe being received by said third opening in said second lower hinge plate and being secured to said second lower hinge plate for movement therewith;
said end gate being selectively movable between extended and folded positions;
said end gate, when in said extended position, having said outer end thereof adjacent to the second wall of the building;
said end gate, when in said folded position, being positioned adjacent said outer side of said center gate section at said second end thereof;
a first ground engaging support secured to said center gate section at said first end thereof; and
a second ground engaging support secured to said center gate section at said second end thereof.

3. A portable gate system for use in an area having a first fence with first and second ends and a second fence which extends transversely from the first end of the first fence, comprising:
an elongated and vertically disposed center gate section having a first end, a second end, a lower end, an upper end, an inner side and an outer side;
a vertically disposed first tubular member, having upper and lower ends, secured to said first end of said center gate section;
a vertically disposed second tubular member, having upper and lower ends, secured to said second end of said center gate section;

a vertically disposed center divide gate having inner and outer ends;

said inner end of said center divide gate being hingedly secured about a vertical axis to said center gate section at the center length thereof at said inner side thereof;

said center divide gate being selectively movable between folded and extended positions with respect to said center gate section;

said center divide gate extending transversely from said inner side of said center gate section when in said extended position whereby said outer end of said center divide gate is positioned closely adjacent to the first fence;

said center divide gate being positioned adjacent said inner side of said center gate section at one end thereof when in said folded position;

an elongated and vertically disposed first pipe, having upper and lower ends, positioned in said first tubular member;

said first tubular member being rotatable with respect to said first pipe;

said upper end of said first pipe being positioned above said upper end of said first tubular member;

said lower end of said first pipe being positioned below said lower end of said first tubular member;

a horizontally disposed first upper hinge plate having first, second and third openings formed therein;

said first upper hinge plate being positioned above said upper end of said first tubular member;

said upper end of said first pipe being received by said first opening in said first upper hinge plate and being secured to said first upper hinge plate for movement therewith;

a horizontally disposed first lower hinge plate having first, second and third openings formed therein;

said first lower hinge plate being positioned below said lower end of said first tubular member;

said lower end of said first pipe being received by said first opening in said first lower hinge plate and being secured to said first lower hinge plate for movement therewith;

an elongated and vertically disposed second pipe, having upper and lower ends, positioned in said second tubular member;

said second tubular member being rotatable with respect to said second pipe;

said upper end of said second pipe being positioned above said upper end of said second tubular member;

said lower end of said second pipe being positioned below said lower end of said second tubular member;

a horizontally disposed second upper hinge plate having first, second and third openings formed therein;

said second upper hinge plate being positioned above said upper end of said second tubular member;

said upper end of said second pipe being received by said first opening in said second upper hinge plate and being secured to said second upper hinge plate for movement therewith;

a horizontally disposed second lower hinge plate having first, second and third openings formed therein;

said second lower hinge plate being positioned below said lower end of said second tubular member;

said lower end of said second pipe being received by said first opening in said second lower hinge plate and being secured to said second lower hinge plate for movement therewith;

a vertically disposed first end divide gate having an inner end, an outer end, an upper end, and a lower end;

said first end divide gate having a vertically disposed third tubular member, with upper and lower ends, at said inner end thereof;

an elongated and vertically disposed third pipe, having upper and lower ends, positioned in said third tubular member;

said third tubular member being rotatable with respect to said third pipe;

said upper end of said third pipe being received by said second opening in said first upper hinge plate and being secured to said first upper hinge plate for movement therewith;

said lower end of said third pipe being received by said second opening in said first lower hinge plate and being secured to said first lower hinge plate for movement therewith;

said first end divide gate being selectively hingedly movable with respect to said center gate section between extended and folded positions;

said first end divide gate, when in said extended position, extending transversely outwardly with respect to said center gate section whereby said outer end of said first end divide gate is positioned adjacent the first fence;

said first end divide gate, when in said folded position, being positioned adjacent said inner side of said center gate section at said first end thereof;

a vertically disposed second end divide gate having an inner end, an outer end, an upper end and a lower end;

said second end divide gate having a vertically disposed fourth tubular member, with upper and lower ends, at said inner end thereof;

an elongated and vertically disposed fourth pipe, having upper and lower ends, positioned in said fourth tubular member;

said fourth tubular member being rotatable with respect to said fourth pipe;

said upper end of said fourth pipe being received by said second opening in said second upper hinge plate and being secured to said second upper hinge plate for movement therewith;

said lower end of said fourth pipe being received by said second opening in said second lower hinge plate and being secured to said second lower hinge plate for movement therewith;

said second end divide gate being selectively movable with respect to said center gate section between extended and folded positions;

said second end divide gate when in said extended position, extending transversely outwardly with respect to said center gate section whereby said outer end of said second end divide gate is positioned adjacent the first fence;

said second end divide gate when in said folded position being positioned adjacent said inner side of said center gate section at said second end thereof;

an elongated and vertically disposed first end gate having inner and outer ends;

said first end gate having a vertically disposed fifth tubular member, with upper and lower ends, at said inner end thereof;

an elongated and vertically disposed fifth pipe, having upper and lower ends, positioned in said fifth tubular member;

said fifth tubular member being rotatable with respect to said fifth pipe;

said upper end of said fifth pipe being received by said third opening in said first upper hinge plate and being secured to said first hinge plate for movement therewith;

said lower end of said fifth pipe being received by said third opening in said first lower hinge plate and being secured to said first lower hinge plate for movement therewith;

said first end gate being selectively hingedly movable between extended and folded positions with respect to said first upper hinge plate and said lower hinge plate;

said first end gate, when in said extended position being parallel to and spaced from the first fence;

said first end gate, when in said folded position, being positioned adjacent said outer side of said center gate section at one end thereof;

an elongated and vertically disposed fence mounted gate having inner and outer ends;

said inner end of said fence mounted gate configured to be hingedly secured to the first fence;

said fence mounted gate being selectively movable to an extended position wherein said fence mounted gate extends transversely from the first fence for connection to said outer end of said first end gate when said first end gate is in said extended position;

an elongated and vertically disposed second end gate having first and second ends;

said second end gate having a vertically disposed sixth tubular member, with upper and lower ends, at said inner end thereof;

an elongated and vertically disposed sixth pipe having upper and lower ends, positioned in said sixth tubular member;

said sixth tubular member being rotatable with respect to said sixth pipe;

said upper end of said sixth pipe being received by said third opening in said second upper hinge plate and being secured to said second upper hinge plate for movement therewith;

said lower end of said sixth pipe being received by said third opening in said second lower hinge plate and being secured to said second lower hinge plate for movement therewith;

said second end gate being selectively movable between extended and folded positions;

said second end gate, when in said extended position, having said outer end thereof adjacent to the second fence;

said second end gate, when in said folded position, being positioned adjacent said outer side of said center gate section at said second end thereof;

a first ground engaging support secured to said center gate section at said first end thereof; and a second ground engaging support secured to said center gate section at said second end thereof.

* * * * *